Oct. 14, 1941.    M. A. BUETTELL    2,258,970
VARIABLE SPEED TRANSMISSION DEVICE
Filed Aug. 20, 1938    4 Sheets-Sheet 1

Inventor.
Marc A. Buettell
by Parker T Carter
Attorneys.

Oct. 14, 1941.   M. A. BUETTELL   2,258,970
VARIABLE SPEED TRANSMISSION DEVICE
Filed Aug. 20, 1938   4 Sheets-Sheet 2

Inventor
Marc A. Buettell
by Parker Carter
Attorneys.

Oct. 14, 1941.　　　M. A. BUETTELL　　　2,258,970
VARIABLE SPEED TRANSMISSION DEVICE
Filed Aug. 20, 1938　　　4 Sheets-Sheet 3
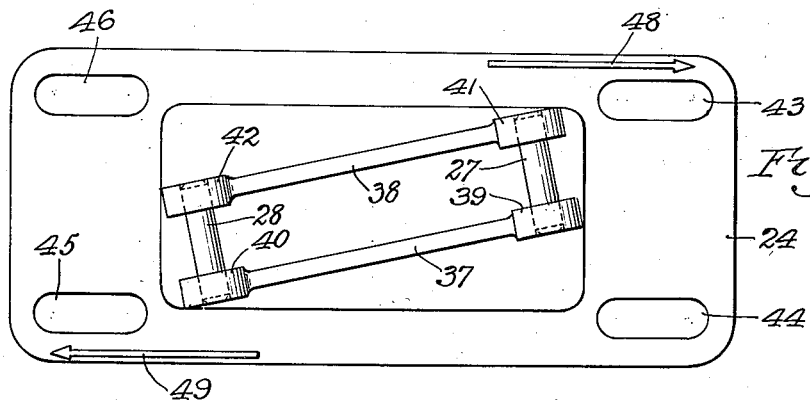
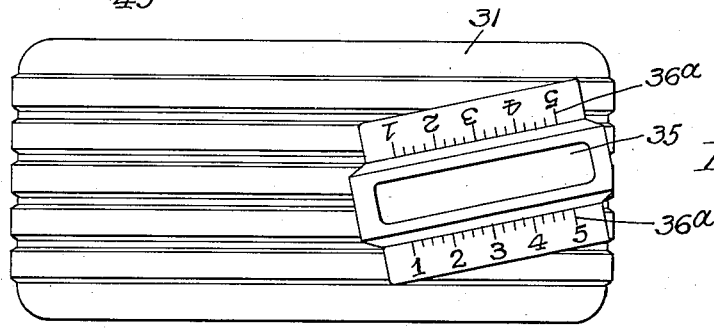
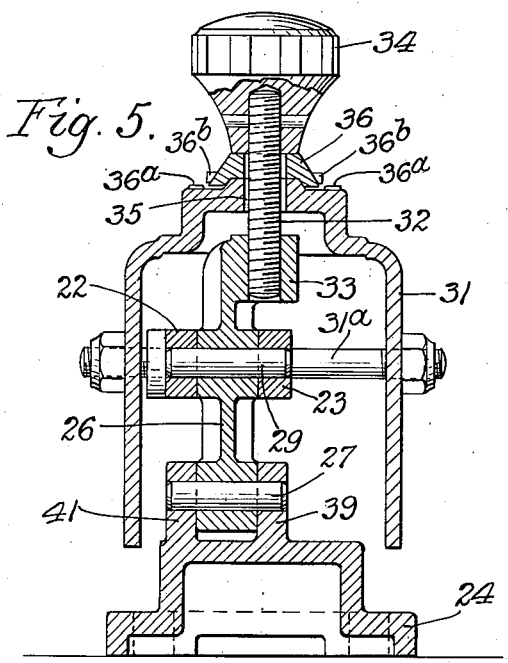
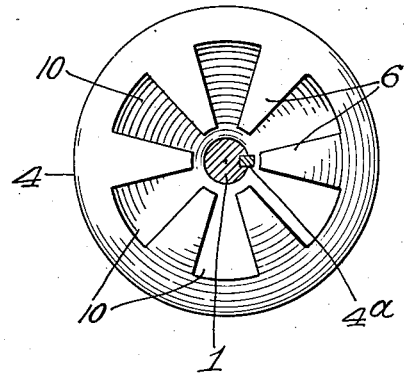
Inventor.
Marc A. Buettell
by Parker & Carter
Attorneys.

Oct. 14, 1941.    M. A. BUETTELL    2,258,970
VARIABLE SPEED TRANSMISSION DEVICE
Filed Aug. 20, 1938    4 Sheets—Sheet 4

Inventor
Marc A. Buettell
by Parker & Carter
Attorneys.

Patented Oct. 14, 1941

2,258,970

UNITED STATES PATENT OFFICE 2,258,970

VARIABLE SPEED TRANSMISSION DEVICE

Marc A. Buettell, Sycamore, Ill., assignor to Ideal Commutator Dresser Company, Sycamore, Ill., a copartnership composed of John Walker Becker and Louis C. Becker Application August 20, 1938, Serial No. 225,841

12 Claims. (Cl. 74—230.17)

This invention relates to variable speed transmission devices and has for its object to provide a new and improved device of this description.

The invention has as a further object to provide a variable speed transmission device by means of which the speeds within the limits of the maximum and minimum speeds can be varied the smallest possible fraction, that is, there can be substantially an infinite number of variations between the maximum and minimum speeds.

The invention has as a further object to provide a variable speed transmission device having a parallelogram formation for controlling the movement of the sheaves for the belts forming a part of the device.

The invention has as a further object to provide a variable speed transmission device including a cover for covering the same which does not interfere with the operation of the device.

The invention has as a further object to provide a variable speed transmission device mounted upon a base having its sides parallel to the driving and driven belts.

The invention has as a further object to provide a variable speed transmission device that can be easily and quickly installed.

The invention has further objects which are more particularly pointed out in the accompanying description.

Referring now to the drawings:

Fig. 5 is a sectional view taken on lines 5—5 of Figs. 1 and 2;

Fig. 6 is a plan view of the supporting base plate;

Fig. 7 is a plan view of the enclosing casing;

Fig. 8 is a detailed elevation showing the face of one of the sheaves;

Like numerals refer to like parts throughout the several figures.

Figure 1:
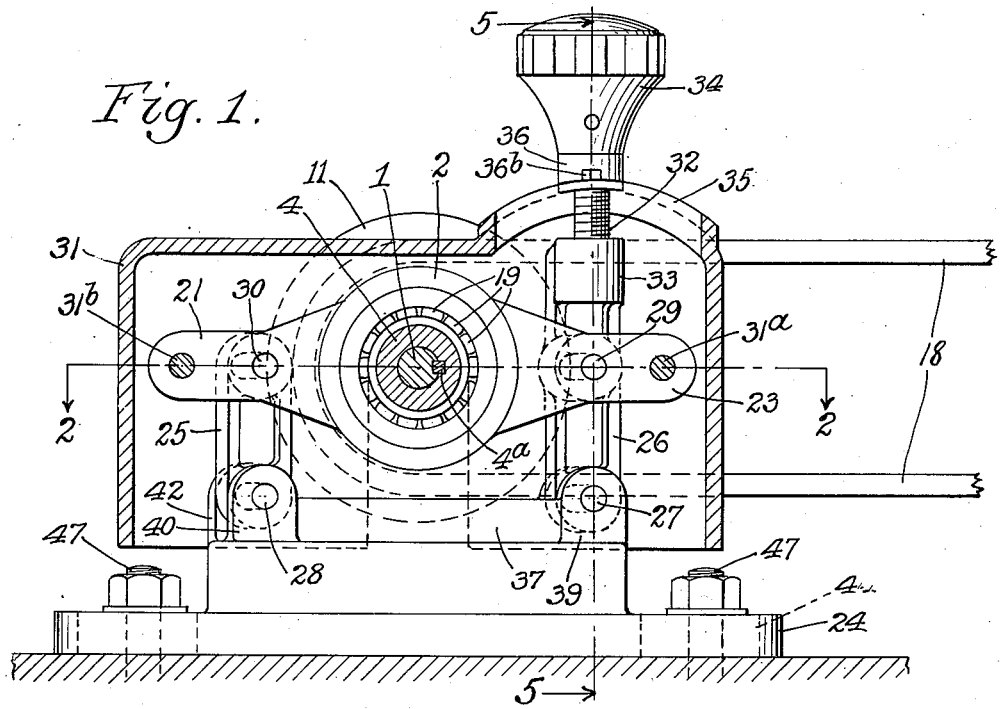
Fig. 1 is a side elevation of one form of variable speed transmission device embodying the invention with the enclosing casing in section taken at the zigzag line 1—1 of Fig. 2.

Referring now to the drawings wherein one form of the device embodying the invention is shown, there is provided a shaft 1 which is mounted on suitable bearings in a bearing housing 2. This shaft has two sheaves on it. One of these sheaves consists of the elements 3 and 4. The element 3 is fastened to the shaft 1. The element 4 rotates with the shaft but slides therealong, being splined thereto as by the spline 4a. The elements 3 and 4 have telescoping and interlocking parts 5 and 6 and have opposed inclined faces 7 and 8 which form a V-shaped groove into which the belt 9 from the driving device, such as the motor, is received. Fig. 8 shows one face of one of the sheave elements, as for example element 4. The parts 5 of element 3 are received in the recesses 10 in the element 4.

The sheave at the other end of the shaft 1 has similar elements 11 and 12. The elements 11 and 12 rotate with the shaft, but slide therealong, being splined thereto. The elements 11 and 12 have telescoping and interlocking parts 14 and 15, and inclined faces 16 and 17 between which the belt 18 to the driven device is received, which are similar to those described in connection with the parts 5 and 6 and the construction illustrated in Fig. 8. The parts 4 and 11 are mounted and supported on the bearing housing 2 and are preferably provided with roller or ball bearings 19, while the parts 3 and 12 are mounted upon the shaft 1, the shaft itself being carried by the bearing housing 2.

Figure 2:
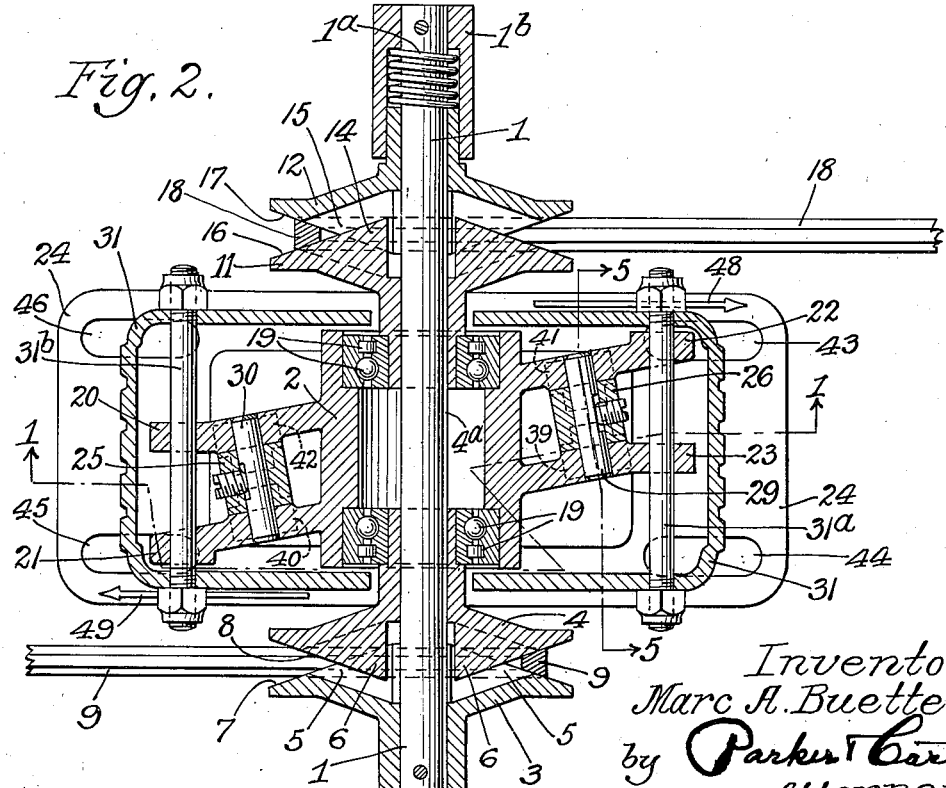
Fig. 2 is a sectional plan view taken on line 2—2 of Fig. 1.
Figure 3:
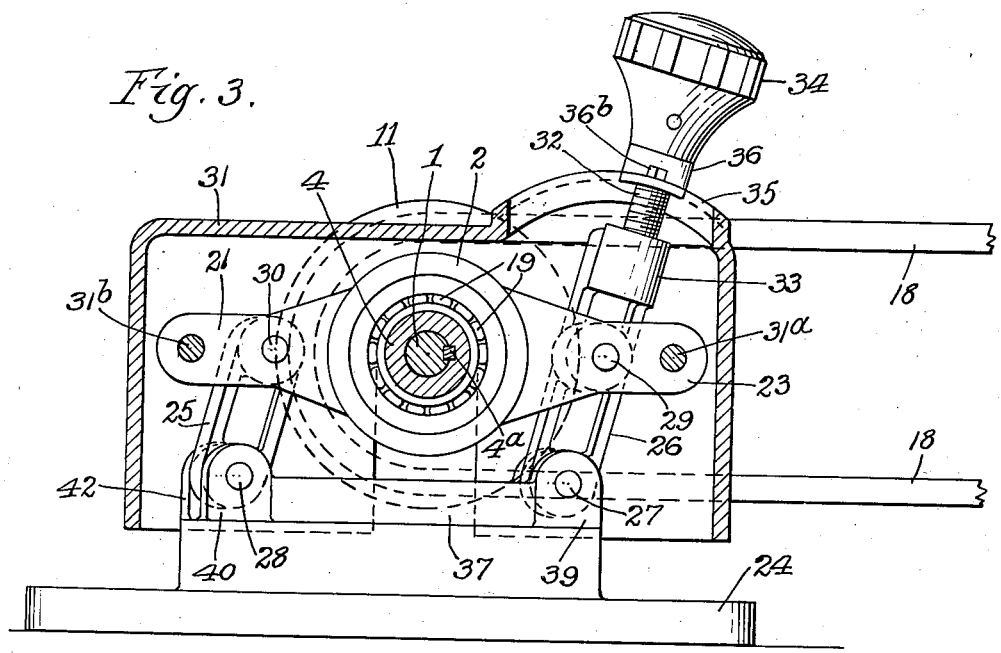
Fig. 3 is a view similar to Fig. 1 showing a different position of the parts.
Figure 4:
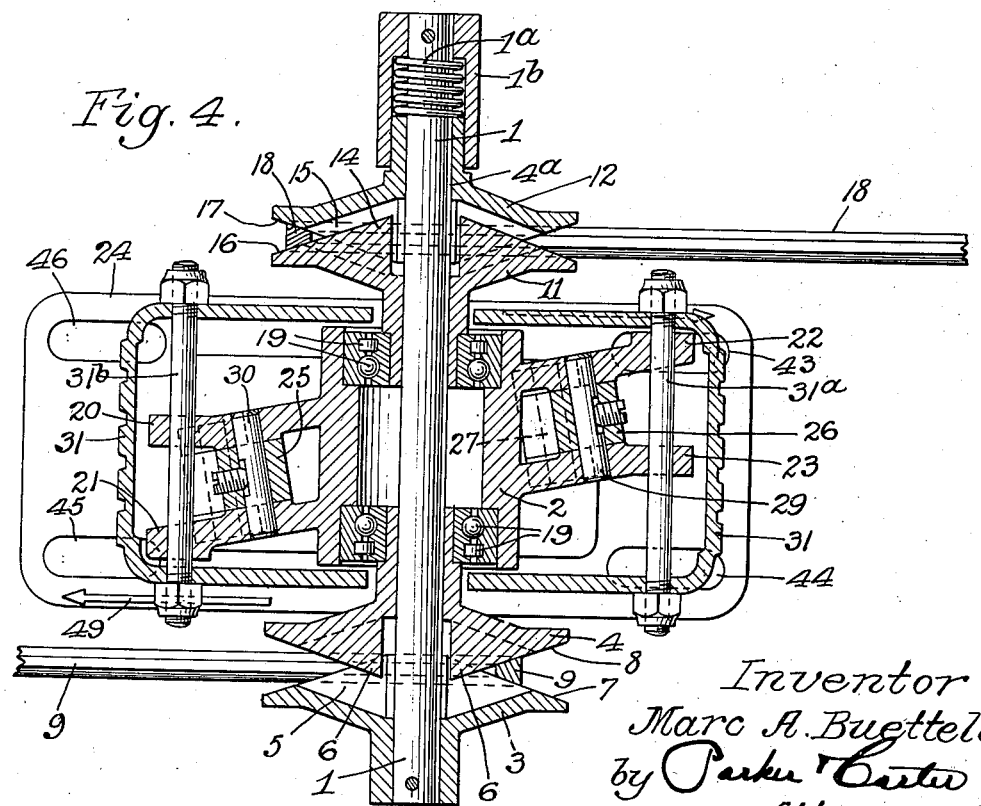
Fig. 4 is a sectional view similar to Fig. 2 showing a different position of the parts.

The bearing housing is provided with projecting arms 20, 21, 22 and 23, by means of which it and the shaft and the sheaves are rockably mounted on the base 24. Any desired means for producing this rockable support may be used. As here shown, there are two links 25 and 26 which are pivoted to the base 24 at 27 and 28, and which are also pivoted to the bearing housing by being pivoted to the arms 20, 21, 22 and 23 by the pivots 29 and 30. These arms extend at an angle to the shaft 1 and to the bearing housing 2, as clearly shown in Fig. 2.

The casing 31, which covers the mechanism, is connected with the arms 20, 21, 22 and 23 by means of the connecting devices or bolts 31a and 31b which pass through these arms and through the casing, and which are provided with nuts so that they may be easily removed. It will be noted that the arms 20, 21, 22 and 23 extend in a generally diagonal direction with relation to the shaft 1 and the bearing housing 2, and that the means of supporting the bearing housing and the arms by the pivoted links 25 and 26 permits the movement of the bearing housing and shaft along this generally diagonal direction by a parallelogram arrangement.

There is preferably a spring 1a surrounding the shaft 1 and engaging the hub of the member 12 and also engaging an enclosing part 1b which is fastened to the shaft. This spring tends to press the member 12 toward the belt and helps to keep a tight contact therewith.

The shaft 1 and bearing housing 2 and associated parts may be moved by any desired means. As herein shown, in Figs. 1 to 6, there is provided a shifting lever 32 which is connected to one of the members of the parallelogram. In the particular construction shown, one of the links, as for example the link 26, see Fig. 5, is provided with an upwardly projecting part 33 and the shifting lever 32 is connected therewith in any desired manner. In the construction shown in Fig. 5, this shifting lever is screw-threaded and is threaded into a screw-threaded opening in the part 33. There is a handle 34 for moving the shifting lever and the associated parts. There is a diagonal slot 35 in the casing 31 along which the shifting lever 32 moves.

The handle 34 is screw-threaded to the shifting lever 32 and is loosened or unscrewed when it is desired to shift the parts and is then tightened up when it is desired to hold the parts in any desired position. The tightening up of the handle 34 causes the member 36 to engage the casing so as to hold the parts in any desired position. The casing preferably has one or more graduated scales 36a and the shifting device has one or more pointers 36b which move along the graduated scale when the shifting device is moved, so as to indicate the position of the shifting device. It will be seen that by this means the parts can be moved any desired distance for adjustment and that this distance can be very small and as small as desired, thereby giving any desired limited adjustment which may be required.

When the shifting lever is moved the casing 31, shaft 1, bearing housing 2 and all associated parts are moved in a diagonal direction, the parts being moved about the pivots 27 and 28. The base 24 is provided with upstanding members 37 and 38 which extend in a diagonal direction thereacross, these upstanding members having upstanding supports 39, 40, 41 and 42 in which are received the shafts 27 and 28. These shafts may of course be rotatable in the supports or may be fixed in the supports and the links 25 and 26 rotatable thereon. The base 24 is substantially parallel with the belts 9 and 18 and is provided at the corners with openings 43, 44, 45 and 46 for the fastening members 47. These openings are preferably elongated so as to permit the base to be adjusted. The base also preferably has indicating devices 48 and 49 thereon which indicate the direction of the belts when placed in position.

By means of this construction, the device can be easily, quickly and cheaply installed for all that is necessary is to place the base and associated parts in between the devices which are to be connected and place the belts in position and then properly adjust the base with relation to the belts and tighten up the fastening devices. The base, shaft, bearing housing and associated parts, it will be noted, move not only in a diagonal direction but in a more or less circular direction so that when in the maximum position at one end the parts are down and they then move up to a maximum height and then move down again to the maximum position in the other direction. The casing 31 is arranged to permit this movement and still to cover all the mechanism. This is accomplished in the construction shown by having the links 25 and 26 pivoted at a point above the bottom of the casing and above the parts of the base where the fastening devices are received, as by means of the upstanding parts 37, 38 and the supports thereon for the shafts 27 and 28.

Figure 9:
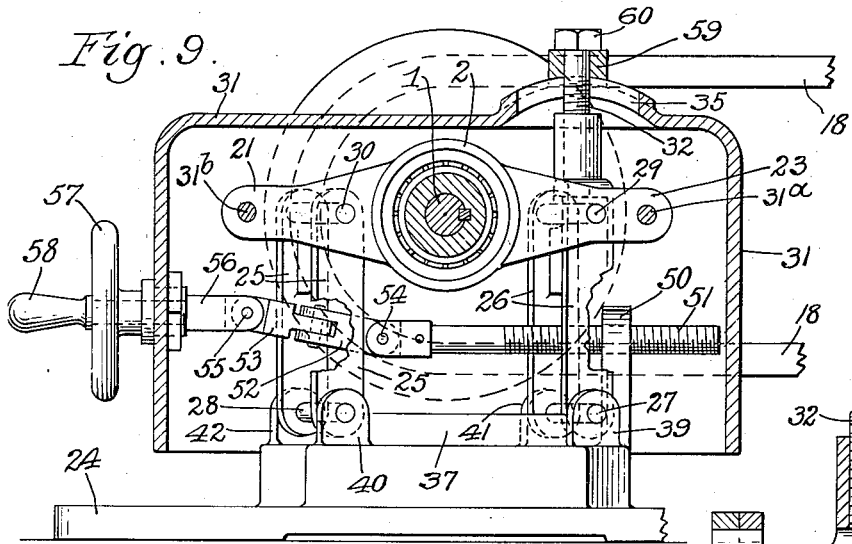
Fig. 9 is a view similar to Fig. 1 showing a modified form.
Figure 11:
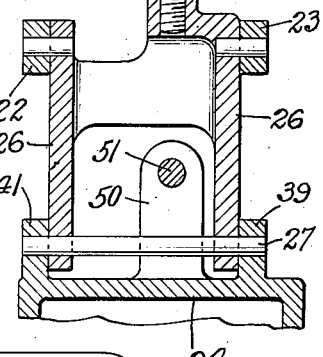
Fig. 11 is a sectional view taken on line 11—11 of Fig. 10.
Figure 10:
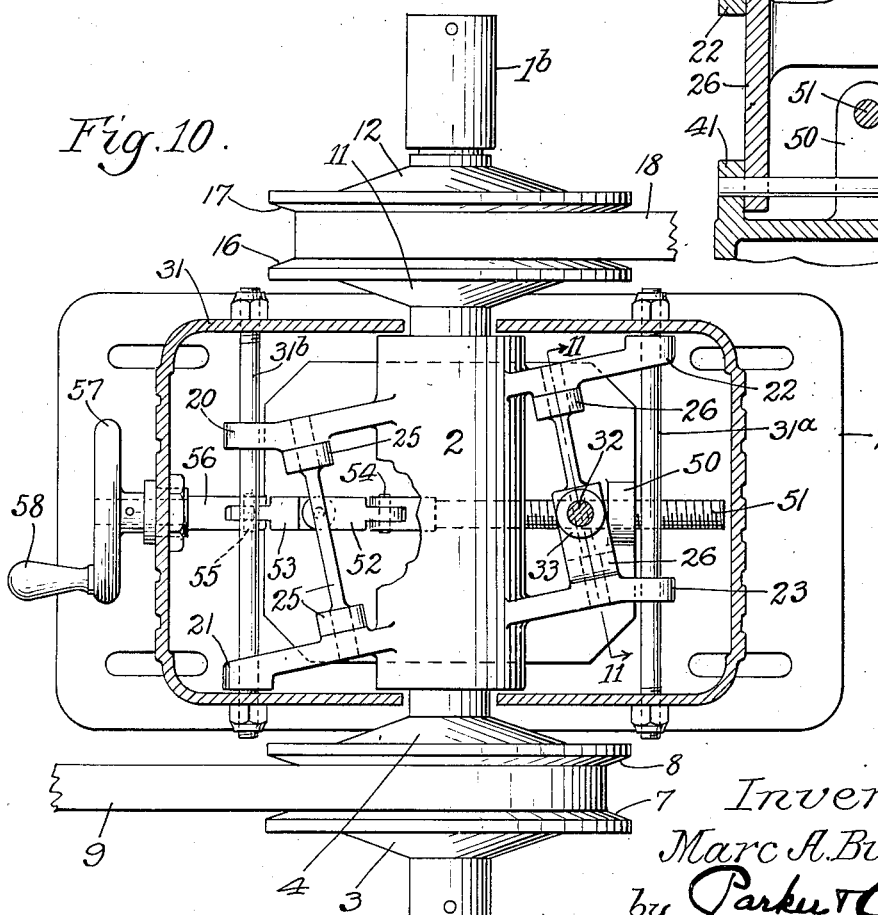
Fig. 10 is a plan view of the construction shown in Fig. 9 with the enclosing casing in section.

In Figs. 9 and 10 there is shown a modified construction. The purpose of this construction is to secure a very fine adjustment of the device, in fact a micrometer adjustment. In this construction, which may be the same as that shown in Figs. 1 and 2 for example in everything except the addition for adjustment, there is a member 50 attached to the base 24 and this member has a threaded opening. A screw-threaded adjusting member 51 passes through this opening and is connected by a universal joint composed of the pivoted members 52 and 53, the member 52 being pivoted at 54 with the member 51 and the member 53 being pivoted at 55 with a shaft 56 which passes through an opening in the casing and which is provided with some suitable handle, as for example the hand wheel 57 having the hand hold 58. It will be seen that by rotating this hand wheel 57 the casing, shaft, bearing housing and associated parts can be moved an infinitely small amount so as to get a micrometer adjustment of the parts.

This form of micrometer adjustment may be used in any of the constructions desired and is particularly adaptable for large units. This adjustment also allows the units to be mounted in a vertical position instead of a horizontal position so that the mechanical advantage of the screw overcomes the weight of the parts. This form of adjustment also lends itself to remote control, as by means of a motor, and also adapts itself to chain or V-belt sheaves.

In all the constructions herein shown it will be noted that the mechanism is shifted by the locking device. That is, the shifting device must be unlocked and the shifting accomplished and then the shifting device locked in position, the shifting device having two functions, that of shifting and that of locking. In the construction shown in Figs. 9 and 10, instead of using the handle 34 on the shifting lever 32, this handle is removed. The shifting lever 32 has a pointer 59 thereon, which moves along the graduated scale 36a to give the proper indication. The shifting device 32 in this instance may consist of a bolt with a head 60 which may be tightened if desired to assist in holding the parts in position. By means of the adjustment of the base, the belt stretch can be easily and quickly taken care of. The case covers up the working parts so that dirt and dust cannot get in and also makes a better looking construction and also acts to make it easy to lock the device in any desired position.

I claim:

1. A variable speed transmission device for use with driven and driving belts comprising a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, a shifting device for said mechanism and a casing located between the sheaves for covering said mechanism, said casing connected with said shifting mechanism so as to move therewith.

2. A variable speed transmission device for use with driven and driving belts comprising a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, a shifting device for said mechanism and a casing located between the sheaves for covering said mechanism, said casing connected with said shifting mechanism so as to move therewith, a shifting lever connected with said shifting mechanism, and a diagonal slot in said casing through which said shifting lever projects.

3. A variable speed transmission device for use with driven and driving belts comprising a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, a shifting device for said mechanism and a casing located between the sheaves for covering said mechanism, said casing connected with said shifting mechanism so as to move therewith, a shifting lever connected with said shifting mechanism, and a diagonal slot in said casing through which said shifting lever projects, and means associated with said shifting lever for locking the parts in position.

4. A variable speed transmission device for use with driven and driving belts comprising a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, and an actuating device for actuating said shifting mechanism, said actuating device comprising a member attached to the shifting mechanism, a handle rotatably connected with said member, a locking part along which said handle moves and a locking part between said handle and the first mentioned locking part, brought into locking engagement with the first mentioned locking part by rotating said handle, so as to lock the actuating device in position, whereby the handle acts as a locking device and also as a means for moving the shifting mechanism.

5. A variable speed transmission device for use with driven and driving belts comprising a base, a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, said shifting mechanism extending diagonally across said base, said shifting mechanism being pivotally connected with said base on opposite sides of said shaft and connecting the shaft with said base, and an actuating device for moving said shifting mechanism and shaft diagonally along said base, said base being provided near the corners with slots for fastening devices, said slots being substantially parallel to each other and to the belts on the sheaves and at an angle to said diagonal shifting mechanism.

6. A variable speed transmission device for use with driven and driving belts comprising a shaft, two sheaves thereon, each having two relatively adjustable elements between which the driven and driving belts are received, mechanism for shifting the position of the elements of the sheaves relative to each other to vary inversely the distance of the portion of the belt engaging faces of one sheave engaged by its associated belt from the shaft with relation to the portion of the other sheave engaged by its associated belt, a shifting device for said mechanism and a casing located between the sheaves for covering said mechanism, said casing connected with said shifting mechanism so as to move therewith, a base for said shifting mechanism, two upstanding diagonal parallel members upon said base, and means for movably connecting the shifting mechanism with said upstanding members.

7. A variable speed transmission device for use with driven and driving belts connected with a driven and a driving device comprising a shaft, two sheaves thereon, each having two relatively adjustable elements between which the driven and driving belts are received, a bearing housing through which said shafts extends having projections which project therefrom at an angle to said shaft, a base, links on opposite sides of said shaft connecting said projections with said base, the projections on said bearing housing extending diagonally across said base, two of the edges of said base being substantially at right angles to said shaft, said base having slots parallel to said edges, and fastening devices extending through said slots for fastening the base in position, said base being movable along said fastening devices and in a direction parallel to said edges to move the sheaves toward or from the driving device and still maintain the sheaves in their aligned positions with relation to the driving and driven devices.

8. A variable speed transmission device for use with driven and driving belts comprising a shaft, two sheaves thereon, each having two relatively adjustable elements between which the driven and driving belts are received, a bearing housing through which said shaft extends having projections which project therefrom at an angle to said shaft, a base, links connecting said projections with said base, the projections on said bearing housing extending diagonally across said base, two edges of said base being substantially at right angles to said shaft, said base having slots at its corners substantially parallel with said edges, whereby when the base is adjusted longitudinally the sheaves are maintained in their aligned positions.

9. A variable speed transmission device for use with driven and driving belts comprising a shaft, two sheaves thereon, each having two relatively adjustable elements between which the driven and driving belts are received, a bearing housing through which said shaft extends having projections which project therefrom at an angle to said shaft, a base, links connecting said projections with said base, a casing for said bearing housing and associated parts, said casing being connected therewith, a shifting device connected with said bearing housing, a diagonal slot in said casing through which said shifting device passes.

10. A variable speed transmission device for use with driven and driving belts comprising a shaft, two sheaves thereon, each having two relatively adjustable elements between which the driven and driving belts are received, a bearing housing through which said shaft extends having projections which project therefrom at an angle to said shaft, a base, links connecting said projections with said base, a casing for said bearing housing and associated parts, said casing being connected therewith, a shifting device connected with said bearing housing, a diagonal slot in said casing through which said shifting device passes, and means associated with said shifting device for locking it in any desired position so as to lock the shifting mechanism.

11. A variable speed transmission device for use with driven and driving belts comprising a shaft, two sheaves thereon, each having two relatively adjustable elements between which the driven and driving belts are received, a bearing housing through which said shaft extends having projections which project therefrom at an angle to said shaft, a base, links connecting said projections with said base, the projections on said bearing housing extending diagonally across said base, a casing for said bearing housing and associated parts and connected thereto so as to move therewith, and a combined shifting and locking device for said bearing housing and associated parts.

12. A variable speed transmission device for use with driven and driving belts comprising a shaft, two sheaves thereon, each having two relatively adjustable elements between which the driven and driving belts are received, a bearing housing through which said shaft extends having projections which project therefrom at an angle to said shaft, a base, links connecting said projections with said base, the projections on said bearing housing extending diagonally across said base, a casing for covering said bearing housing and associated parts, a shaft projecting through said casing, means for rotating said shaft, a threaded member connected with said shaft by a universal joint, and a member connected with said base having a threaded opening through which said threaded member passes.

MARC A. BUETTELL.